(No Model.)

J. T. CASHMAN.
DUMPING SCOW.

No. 371,922. Patented Oct. 25, 1887.

Witnesses.
S. N. Piper
R. B. Torrey

Inventor.
James T. Cashman
by R. H. Eddy, atty.

UNITED STATES PATENT OFFICE.

JAMES TIMOTHY CASHMAN, OF HANOVER, MASSACHUSETTS.

DUMPING-SCOW.

SPECIFICATION forming part of Letters Patent No. 371,922, dated October 25, 1887.

Application filed March 16, 1887. Serial No. 231,210. (No model.)

*To all whom it may concern:*

Be it known that I, JAMES TIMOTHY CASHMAN, of Hanover, in the county of Plymouth, of the Commonwealth of Massachusetts, have invented a new and useful Improvement in Dumping-Scows; and I do hereby declare the same to be described in the following specification, and represented in the accompanying drawings, of which—

Figure 1:
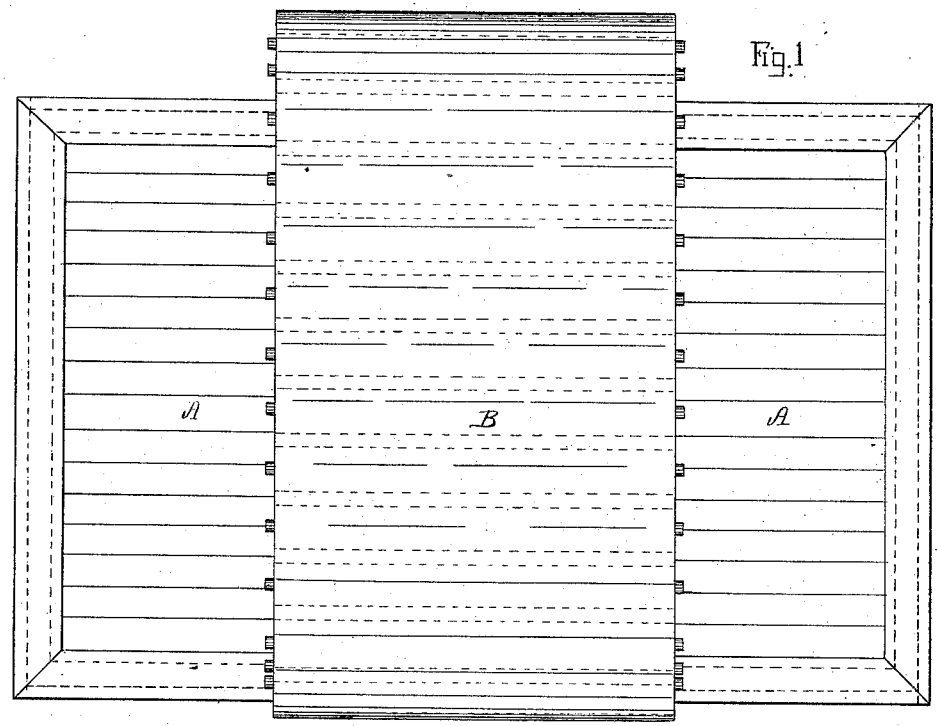
Figure 2:
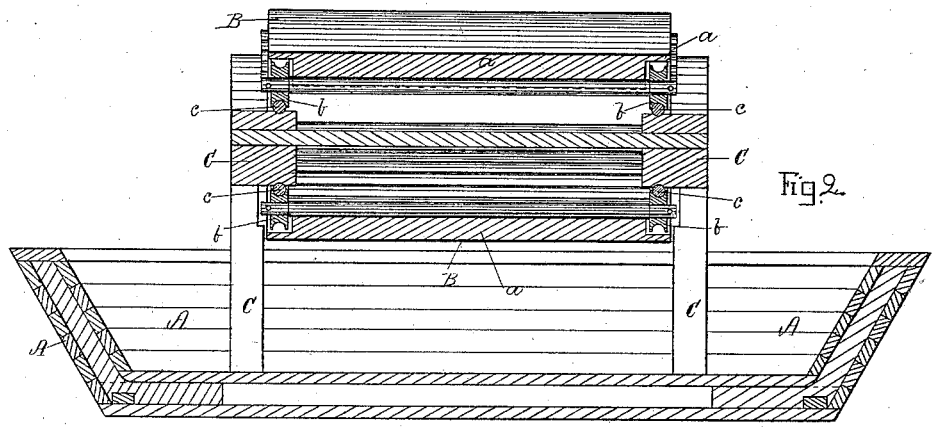
Figure 3:
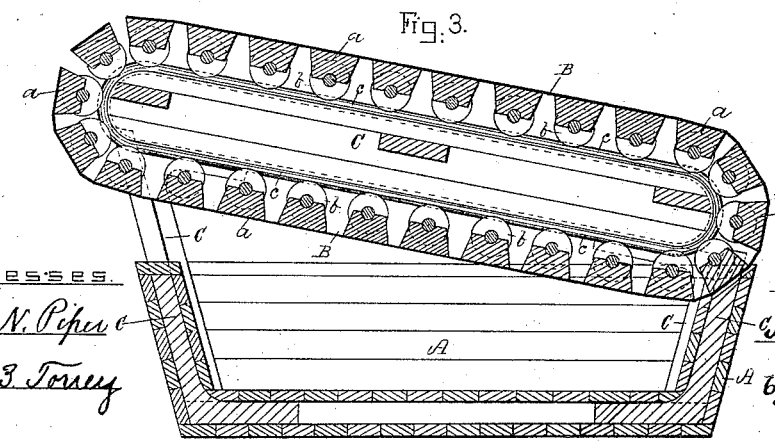

Figure 1 is a top view, Fig. 2 a transverse and median section, and Fig. 3 a longitudinal and median section, of a dumping-scow provided with my invention, the nature of which is defined in the claim hereinafter presented.

In such drawings, A represents a floatable vessel, boat, or scow.

B is an endless apron or platform supported on and fastened to a series of bars, $a$, arranged at equal distances apart, each of such bars at its ends having pivoted to it two peripherally-grooved wheels, $b$, to rest and run upon two endless rails, $c$, arranged as shown, and supported by a suitable frame-work, C, erected in the middle of the boat or scow.

The two endless rails are parallel to each other, and inclined, as represented, with reference to the gunwale or bottom of the scow. The endless apron, by means of its supports, becomes similarly inclined, so that when loaded with stone or other matter resting on its top it will readily, provided its wheels are not blocked, move or revolve under the action of gravity and discharge the load into the water aside of the scow.

Any suitable means may be adopted for blocking the wheels or preventing the endless apron from accidentally revolving and to admit of it revolving as occasion may require.

The scow provided with the inclined endless apron, as described, is intended for use in discharging stone into the water for the purpose of building a breakwater or making a foundation for any structure. The apron may be horizontal across the scow; but it is preferably inclined, as in the latter case it will turn by gravity of its load, or will be very much aided thereby in revolving.

I claim—

The combination of a scow and an endless apron and its supporting wheels and rails or devices arranged transversely of the scow and supported thereon in a position inclined relatively thereto, as specified, the whole being so as to enable a load on the apron, by the action of gravity, when the apron is free to move, to set it in motion, so as to discharge such load over one side of the scow, as set forth.

JAMES TIMOTHY CASHMAN.

Witnesses:
 R. H. EDDY,
 S. N. PIPER.